United States Patent
Read

(10) Patent No.: US 7,607,126 B2
(45) Date of Patent: *Oct. 20, 2009

(54) SYSTEM AND METHOD FOR EXTERNAL OVERRIDE OF ANNOTATIONS

(75) Inventor: David Read, Bellevue, WA (US)

(73) Assignee: BEA Systems, Inc., San Jose, CA (US)

( * ) Notice: Subject to any disclaimer, the term of this patent is extended or adjusted under 35 U.S.C. 154(b) by 971 days.

This patent is subject to a terminal disclaimer.

(21) Appl. No.: 11/134,714

(22) Filed: May 20, 2005

(65) Prior Publication Data

US 2005/0262499 A1    Nov. 24, 2005

Related U.S. Application Data

(60) Provisional application No. 60/573,747, filed on May 21, 2004.

(51) Int. Cl.
G06F 9/44 (2006.01)
G06F 9/45 (2006.01)

(52) U.S. Cl. .................. 717/172; 717/121; 717/120

(58) Field of Classification Search ............... 717/101, 717/118, 120–121, 172–174
See application file for complete search history.

(56) References Cited

U.S. PATENT DOCUMENTS

| | | | |
|---|---|---|---|
| 6,163,880 A | 12/2000 | Ramalingam et al. | |
| 6,327,594 B1 | 12/2001 | Van Huben et al. | 707/200 |
| 6,360,363 B1 | 3/2002 | Moser et al. | 717/170 |
| 6,668,371 B2 | 12/2003 | Hamilton et al. | |
| 6,754,659 B2 | 6/2004 | Sarkar et al. | 707/10 |
| 6,857,012 B2 | 2/2005 | Sim et al. | 709/222 |
| 6,874,143 B1 * | 3/2005 | Murray et al. | 717/173 |
| 6,912,710 B2 * | 6/2005 | Broussard et al. | 717/170 |
| 7,000,230 B1 * | 2/2006 | Murray et al. | 717/172 |
| 7,047,522 B1 | 5/2006 | Dixon et al. | 717/131 |
| 7,069,553 B2 * | 6/2006 | Narayanaswamy et al. | 717/173 |
| 7,127,712 B1 | 10/2006 | Noble et al. | |
| 7,171,650 B2 * | 1/2007 | Fenton et al. | 717/120 |
| 7,174,534 B2 * | 2/2007 | Chong et al. | 717/105 |
| 7,194,730 B2 * | 3/2007 | Pramberger | 717/120 |
| 7,213,231 B1 * | 5/2007 | Bandhole et al. | 717/121 |
| 7,266,819 B2 * | 9/2007 | Helgesen et al. | 717/176 |
| 7,299,450 B2 * | 11/2007 | Livshits et al. | 717/121 |
| 7,305,671 B2 * | 12/2007 | Davidov et al. | 717/172 |
| 7,343,379 B2 * | 3/2008 | Marvin et al. | 707/101 |
| 7,356,577 B2 * | 4/2008 | Collins | 709/221 |

(Continued)

OTHER PUBLICATIONS

Hu et al, "Adaptive self configuration of EJB server: A performance model approach", IEEE, pp. 115-122, 2007.*

Chazalet et al, "A model driven environment for the deployment of pervasive service oriented applications", ACM ICPS, 149-157, 2009.*

(Continued)

Primary Examiner—Anil Khatri
(74) Attorney, Agent, or Firm—Squire, Sanders & Dempsey, L.L.P.

(57) ABSTRACT

A deployable application component can be configured via external annotation overrides at runtime without having to restart the component. An annotation/manifest can be populated to the corresponding application component at build time. The application component can then be configured and changes can be saved as annotation override into an external descriptor in XML format at deploy time. Such external descriptor can then be distributed, parsed, and validated at runtime to configure/update the deployed application component upon receiving notification of deployment changes.

16 Claims, 3 Drawing Sheets

U.S. PATENT DOCUMENTS

| | | | |
|---|---|---|---|
| 7,356,803 | B2 | 4/2008 | Bau et al. |
| 7,383,534 | B1 * | 6/2008 | Agbabian et al. ........... 717/120 |
| 7,426,734 | B2 * | 9/2008 | Debique et al. ............. 719/310 |
| 7,506,309 | B2 * | 3/2009 | Schaefer ..................... 717/120 |
| 2002/0104071 | A1 | 8/2002 | Charisius et al. |
| 2002/0188935 | A1 | 12/2002 | Hertling et al. |
| 2003/0167455 | A1 | 9/2003 | Iborra et al. |
| 2003/0172368 | A1 | 9/2003 | Alumbaugh et al. |
| 2003/0181196 | A1 | 9/2003 | Davidov et al. |
| 2003/0182307 | A1 | 9/2003 | Chen et al. |
| 2004/0024812 | A1 | 2/2004 | Park et al. |
| 2005/0021689 | A1 | 1/2005 | Marvin et al. |
| 2005/0149555 | A1 | 7/2005 | Wang et al. |
| 2005/0154699 | A1 | 7/2005 | Lipkin et al. |

OTHER PUBLICATIONS

Liu et al, A formal framework for component deployment, ACM OOPSLA, pp. 325-343, 2006.*

Bures et al, "Using a product line for creating component system", ACM SAC, pp. 501-508, 2009.*

Steffen Goebel, et al., "Composite Component Support for EJB", Jan. 2004, Trinity College Dublin, WISICT '04, pp. 1-6.

Richard S. Hall, et al., Gravity: Supporting Dynamically Available Serives in Client-Side Applications, Sep. 2003, ACM ESEC/FSC-11, vol. 28, Issue 5, pp. 379-382.

Marshall et al., "Using Software Visualisation to enhace Online Component Markets", Jan. 2004, Australian Computer Society, Inc., APVis '04, vol. 35, pp. 35-41.

Nixon, et al. "Programming Structures for Adaptive Ambient Systems", 2003, ACM, vol. 49, pp. 193-198.

* cited by examiner

```xml
<xs:schema targetNamespace="" xmlns:xs="http://www.w3.org/2001/XMLSchema" xmlns="" elementFormDefault="qualified" attributeFormDefault="unqualified">
    <xs:element name="annotation-overrides" type="annotation-overridesBean"/>
    <xs:complexType name="member-constraintBean">
        <xs:sequence>
            <xs:element name="constraint-type">
                <xs:simpleType>
                    <xs:restriction base="xs:string">
                        <xs:enumeration value="DATE"/>
                        <xs:enumeration value="DECIMAL"/>
                        <xs:enumeration value="INTEGER"/>
                        <xs:enumeration value="URL"/>
                        <xs:enumeration value="URN"/>
                        <xs:enumeration value="URI"/>
                        <xs:enumeration value="XML"/>
                        <xs:enumeration value="FILE"/>
                        <xs:enumeration value="CUSTOM"/>
                        <xs:enumeration value="QNAME"/>
                        <xs:enumeration value="TEXT"/>
                        <xs:enumeration value="JNDINAME_DATASOURCE"/>
                        <xs:enumeration value="JNDINAME_EJB"/>
                        <xs:enumeration value="JNDINAME_JMS_TOPIC"/>
                        <xs:enumeration value="JNDINAME_JMS_QUEUE"/>
                        <xs:enumeration value="JNDINAME_OTHER"/>
                    </xs:restriction>
                </xs:simpleType>
            </xs:element>
            <xs:element name="max-length" type="xs:string" minOccurs="0" maxOccurs="1"/>
            <xs:element name="min-value" type="xs:string" minOccurs="0" maxOccurs="1"/>
            <xs:element name="max-value" type="xs:string" minOccurs="0" maxOccurs="1"/>
            <xs:element name="scale" type="xs:int" minOccurs="0" maxOccurs="1"/>
        </xs:sequence>
    </xs:complexType>
    <xs:complexType name="nested-annotationBean">
        <xs:sequence>
            <xs:element name="member-name" type="xs:string"/>
            <xs:element name="annotation" type="annotation-instanceBean"/>
        </xs:sequence>
    </xs:complexType>
    <xs:complexType name="simple-type-definitionBean">
        <xs:sequence>
            <xs:element name="base-type">
                <xs:simpleType>
                    <xs:restriction base="xs:string">
                        <xs:enumeration value="BYTE"/>
                        <xs:enumeration value="SHORT"/>
                        <xs:enumeration value="INT"/>
                        <xs:enumeration value="LONG"/>
                        <xs:enumeration value="DOUBLE"/>
                        <xs:enumeration value="FLOAT"/>
                        <xs:enumeration value="CHAR"/>
                        <xs:enumeration value="BOOLEAN"/>
                        <xs:enumeration value="STRING"/>
                        <xs:enumeration value="ENUM"/>
                        <xs:enumeration value="CLASS"/>
                    </xs:restriction>
                </xs:simpleType>
            </xs:element>
            <xs:element name="constraint" type="member-constraintBean" minOccurs="0"/>
            <xs:element name="requires-encryption" type="xs:boolean" minOccurs="0" maxOccurs="1"/>
            <xs:element name="default-value" type="xs:string" minOccurs="0" maxOccurs="unbounded"/>
        </xs:sequence>
    </xs:complexType>
</xs:schema>
```

Figure 3

SYSTEM AND METHOD FOR EXTERNAL OVERRIDE OF ANNOTATIONS

CLAIM OF PRIORITY

This application claims priority from the following applications, which are hereby incorporated by reference in their entireties:

U.S. Provisional Patent Application No. 60/573,747, entitled SYSTEM AND METHOD FOR CONTROLS by Kyle Marvin et al., filed May 21, 2004.

CROSS-REFERENCE TO RELATED APPLICATIONS

This application is related to the following co-pending applications which are each hereby incorporated by reference in their entirety:

U.S. application Ser. No. 11/041,588 entitled SYSTEMS AND METHODS FOR CONTROLS, Inventor: Kyle Marvin et al., filed Jan. 24, 2005.

U.S. application Ser. No. 11/088,173 entitled SYSTEMS AND METHODS FOR DESCRIPTOR CLASSES, Inventor: Erick Halpern, filed Mar. 23, 2005.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates to the field of external override of annotations on a software component such as control.

BACKGROUND

An enterprise application component deployable at runtime, such as control, can support a set of properties associated with it and corresponding configuration mechanisms to operate on the properties. Here, the application component can be but is not limited to, a Java® bean, an enterprise Java® bean (EJB), a class, a J2EE module, and other suitable concepts based on, Java®, C++, C#, and other suitable object-oriented programming language. The properties of the component can be configured via annotations/manifest, which describes the invariant state of a plurality of annotations on the fields, types and methods of the component set at the build/design time. Since such annotations (configuration) values may reflect configuration that is specific to a targeted deployment environment of the component, they may need to be overridden (revised) externally at runtime and it is desirable that such annotation override will not require (1) modifying the application component or its packaging and (2) re-start/re-deploy the application component.

BRIEF DESCRIPTION OF THE DRAWINGS

FIG. 3 is an exemplary partial schema for the manifest representing annotation overrides in accordance to one embodiment of the invention.

DETAILED DESCRIPTION

The invention is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

Various embodiments of the present invention provide an external configuration framework that supports the external override of annotations (attribute/property definitions) used to extend/configure an application component at deployment/runtime. Such external override of annotations may include steps to identify those annotations that can be overridden, represent those annotations and their constraints for an instance of an application/module via a persistent file such as XML, include those annotations as an extension to the standard JSR88 "configuration" process, and integrate the overridden values into an application/module at runtime. It does not require change to the source code of the component or the re-start or re-deployment of the component. A console, which can be an Integrated Design Environment (IDE) or an administrative tooling environment such as Jython scripting or other web based administrative application, can also be used so that defining and configuring of the annotation overrides can be a property or wizard-driven process and the definition of customized and pre-configured views (operations) can be managed transparently on behalf of the client.

In some embodiments, the external configuration framework can be implemented in Java® programming language based on Java® beans in accordance with standard configuration process such as JSR88 and the (metadata) annotations can be defined based on the extensible model of JSR-175 annotations and an external configuration file in XML format, in addition to a deployment/distribution and runtime mechanisms. Java®, EJB and control component will be used to illustrate the various embodiments of the invention in the following context.

Figure 1:
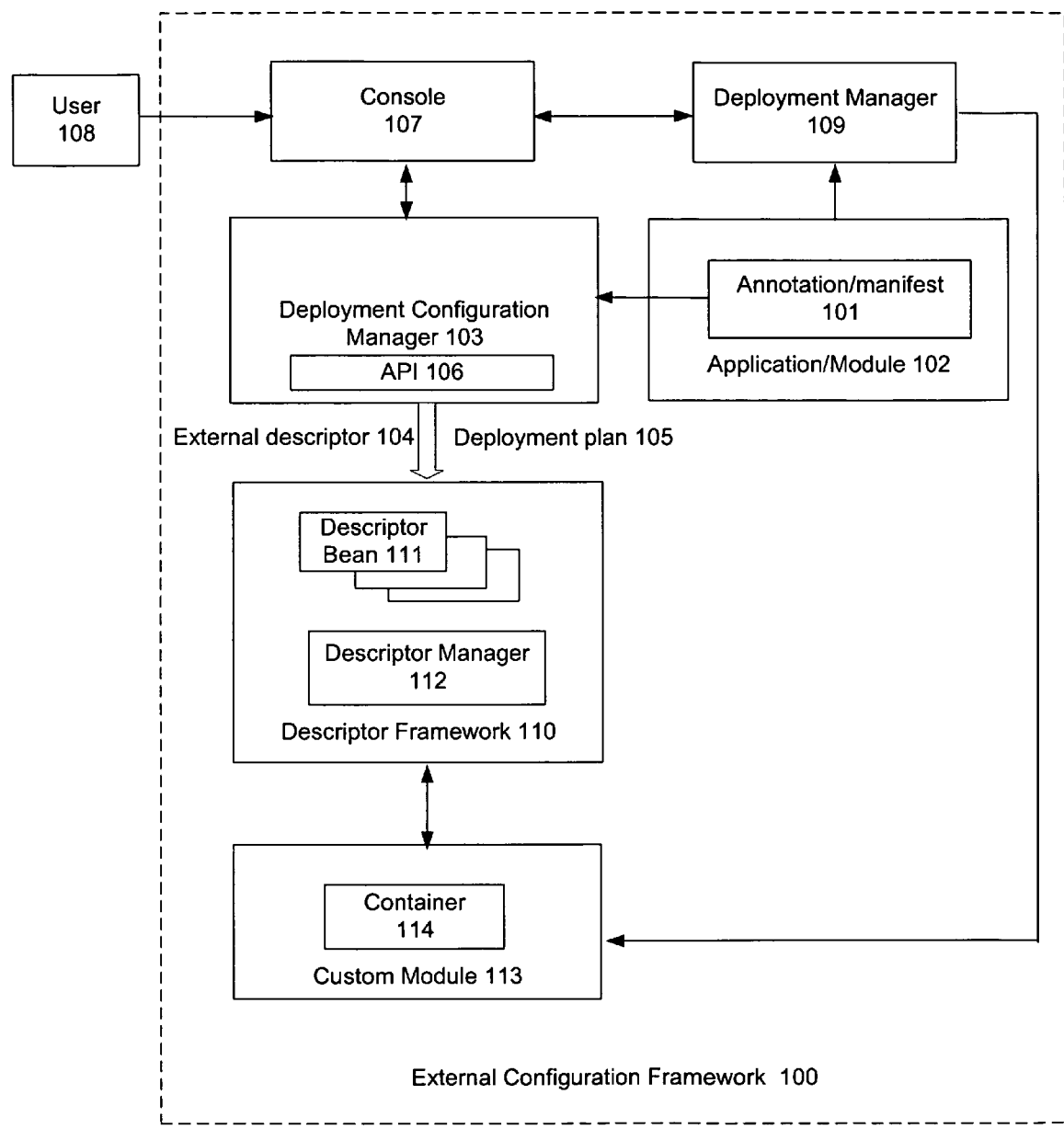
FIG. 1 is an illustration of an exemplary external configuration framework in accordance with one embodiment of the present invention.

FIG. 1 is an illustration of an exemplary external configuration framework 100 in one embodiment of the present invention. Although this diagram depicts components as functionally separate, such depiction is merely for illustrative purposes. It will be apparent to those skilled in the art that the components portrayed in this figure can be arbitrarily combined or divided into separate software, firmware and/or hardware components. Furthermore, it will also be apparent to those skilled in the art that such components, regardless of how they are combined or divided, can execute on the same computing device or multiple computing devices, and wherein the multiple computing devices can be connected by one or more networks.

Referring to FIG. 1, the annotation/manifest 101 can be populated as a build artifact in each application/software component/module 102 at build time, wherein the manifest may contain definition of annotations and their constraints. The configuration of the application/components can be accomplished without being connected to the runtime environment by loading the application/components into a deployment configuration manager 103, which allows configuration actions of the annotations to take place. When all changes are complete, the changes can be saved as annotation overrides to an external descriptor 104 in a separate XML file in addition to a deployment plan 105 via application programming interfaces (API) 106, such as JSR88 APIs, provided by the deployment configuration manager. The configuration of the annotations can be guided by their constraints to insure that the values of the annotation overrides are consistent with the definition of the overridden annotations. An administrative application, such as a console 107, may display annotation overrides through the deployment configuration manager and allow users 108 to interactively edit the annotation overrides under (validated by) the annotation constraints via console editors associated with specific annotation types. A deployment manger 109 can be used to interact with an active runtime environment to distribute and start/stop/update the application component. As part of the standard application deployment, the deployment plan and the external descriptor corresponding to the annotation overrides can be distributed at runtime to a descriptor framework 110, which can then parse and/or validate the annotation overrides into descriptor beans 111 via a descriptor manager 112. These descriptor beans can be organized as descriptor bean trees or graphs. A customized configuration module 113 may listen to deployment and/or update event at runtime, respond to those events by invoking the descriptor framework to parse and/or validate the external descriptor if it is changed, and generate a notification of deployment changes to be delivered to a container. Finally, the container 114 can configure/update the deployed application/component with the annotation overrides upon receiving a notification of deployment changes from the custom module. Note also that the deployed application can be updated/configured without re-starting and/or redeploying the application (container) at runtime, as long as the changes do not include those that require application or sever to restart.

Figure 2:
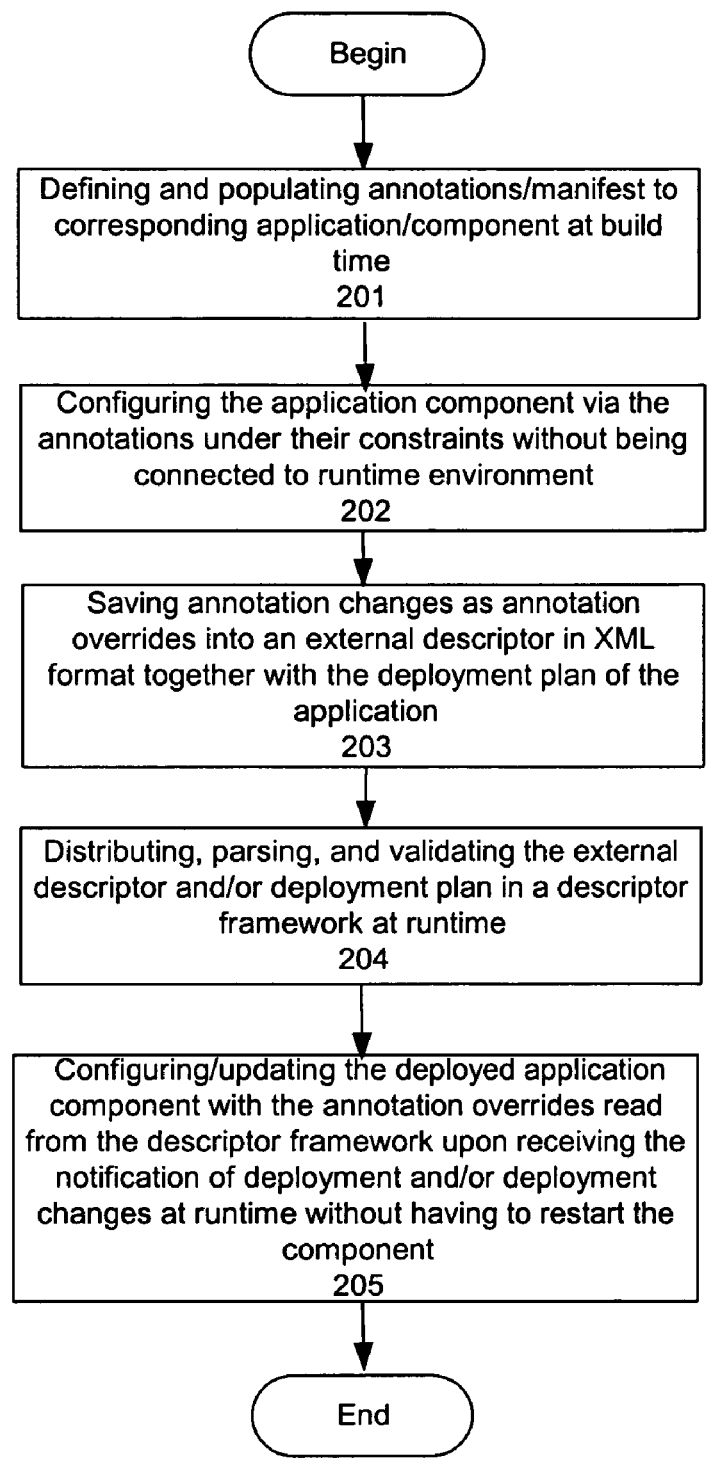
FIG. 2 is a flow chart illustrating an exemplary process for external override of annotations in accordance to one embodiment of the invention.

FIG. 2 is a flow chart illustrating an exemplary process for external override of annotations in accordance to one embodiment of the invention. Although this figure depicts functional steps in a particular order for purposes of illustration, the process is not limited to any particular order or arrangement of steps. One skilled in the art will appreciate that the various steps portrayed in this figure could be omitted, rearranged, combined and/or adapted in various ways.

Referring to FIG. 2, an annotation/manifest can be defined and populated to the corresponding application/software component at build time at step 201, wherein the annotation/manifest can represent a specific scope of the component. For a non-limiting example, the annotation-manifest can be associated with a module or application in J2EE environments. In other environments, other structures could be supported in similar ways. At step 202, the application component can be configured, i.e., values of annotations can be specified under their constraints without being connected to a runtime environment and changes in annotations can be saved as annotation overrides into an external descriptor in XML format together with the deployment plan of the application at step 203. Such external descriptor and deployment plan can then be distributed, parsed, and validated in a descriptor framework at runtime at step 204. Finally, the deployed application component can be configured/updated with the annotation overrides read from the descriptor framework upon receiving notification of deployment and/or deployment changes at runtime without having to restart the component at step 205.

In some embodiments, three key roles can be defined for the configuration of a deployable component such as control:

Control Author, which defines the set of annotations and meta-annotations that configure the behavior of a control, including whether the annotations can be externally overridden.

Control Consumer, which uses annotations to configure the control type or control instance. The control consumer may also use an interface (API) on the properties of the control to get/set the properties at runtime.

Application Deployer (Application/Systems Administrator), which may use, for non-limiting examples, scripting tools or console, to create/update deployment plans that define configuration values for a specific runtime environment.

In some embodiments, a control author may mark annotations as externally configurable using the externalConfig member of the PropertySet annotation. For example, the following is an example of an annotation that allows external override of all property values:

@PropertySet(externalConfig=true)
@Retention(RetentionPolicy.RUNTIME)
public @interface MyAnnotations { . . . }

This approach will force control authors to organize their annotations based (in part) on requirements for external override and simplifies the representation in the manifest.

In some embodiments, the run-time external configuration is exposed to the consumer of a control as a set of properties. The shape of the properties may be defined by JSR175 annotations that (by convention) are nested in the public interface of the control. The concept of exposing runtime configuration via properties is important for a number of reasons:

It is consistent with the concept of controls as Java Beans with special powers.

It provides a level of abstraction over the runtime reflection APIs that are used to get annotation values.

Control authors may use APIs on a component (bean), for a non-limiting example, ControlContext, to get control and method properties. This notion of properties enforces the concept that properties are resolved via the precedence rules described above, rather than by direct access to the class files (i.e. properties are related to annotations but properties are not annotations).

In some embodiments, there are several possible scenarios for an application deployer:

Overriding existing custom annotations on the definitions of a control. An non-limiting example is to replace the endpoint URL on the definition or declaration of a bean such as ServiceControl.

Adding policy-based annotations to control definitions, fields and methods. These are "common" or component specific (e.g. security, reliability, etc) rather than "custom" annotations. Such addition of policy based annotations enables a developer to build and test a application without knowing that these annotations will be required in a production environment.

Overriding "custom" annotations on the method level of a control.

Adding "custom" annotations that did not exist in the control.

In some embodiments, overriding can take several forms as described by the non-exhaustive scenarios A-D below. It is possible that external configuration results in the removal of a value and optional setting of another value. Membership/Optional/Required rules must be re-evaluated in any case where membership is changing (i.e. not just a value replacement). For example, changing the URL on a ServiceControl from HTTP to JMS. The ServiceControl defines the at-least-one membership rule, so the removal of one value implies the need to add another value. These constraints will have to be enforced by the console or other administrative client application.

A. Replacing a Single Value

This is the simplest form of replacement. The value of a member is replaced by a new value. This is indicated by the existence of a non-empty <override-value>element.

B. Removing a Single Value

Removing a value has implications for user model. The absence of a value in the external overrides is not sufficient to indicate user intent (i.e. it could mean the replacement value is "empty" or there is no replacement value). From a configuration standpoint, there should an explicit action that marks the target value as "removed" or "deleted". If marked, any existing value should be cleared and protected from input (i.e. you can't provide a replacement value for a deleted property). An empty value should be considered no-value. An empty value is an empty string or a value made up of only whitespace characters. Since JSR175 does not support the concept of NULL annotation values, there is a need to provide a mapping of empty to NULL.

C. Replacing an Array Value

If a member is an array type, the replacement value is a complete array.

D. Removing an Array Value

Same principals apply as single value. An explicit action to remove the array will be exposed through the UI or other administrative client application. There will not be a mechanism to remove part of an array. Removing values will essentially be creating a new array with the unwanted values missing.

In some embodiments, JSR-175 defines a specific set of valid types that can be used as members in an annotation definition in metadata. There are some types where it does not make sense to support external override, such as class and class[ ], byte and byte[ ], etc. For these cases where external override is not meaningful, a user could:

Disallow a meta-attribute such as AllowExternalOverride when the Attribute includes any of those types.

Ignore those member types that are not reasonable to override (i.e. put the member in the metadata with an indication that it's can not be overridden).

In some embodiments, the process of populating the deployment descriptor/plan may depend on information about annotations and the annotated code contained in the resource being deployed. Such information can be provided by creating external configuration annotations (manifest) and referencing the manifest during the deployment/configuration process. This is necessary to drive the interaction during deployment. There are two approaches to providing this information to the deployment/configuration infrastructure:

Introspect the application as part of the deployment/configuration process, which avoids having to generate a manifest as part of the build. It does mean that the deployment/configuration logic will have load classes in the deployment. While this is possible, it may:

Create too much of a dependency on the runtime framework.

Add significant processing overhead to console tasks.

Create a manifest as part of the "roll-up" build process, and reference the manifest during the deployment/configuration process. A manifest can be generated that enumerates the annotations that have been marked by, for a non-limiting example, setting the externaConfig member in the PropertySet annotation as @PropertySet (externalConfig=true) when the resource is deployed. This manifest establishes the set of annotations that can be overridden and any constraints on those annotations.

In some embodiments, the manifest can be organized to include "what can be" and "what is" (with regard to annotations). This can provide a context for expressing the runtime annotation overrides in terms of explicit add, change, or remove actions. The manifest can also be organized to only describe "what is" (with regard to annotations). The runtime annotation overrides are then assumed to have "add if absent, replace if present" semantics. This may limit the tooling support to overriding existing custom annotations, while permitting the addition of only common or component specific annotations. A full override/add experience for application deployers can be supported under an IDE based administrative tool. However with console-based deployment, which implies a less interactive tooling environment, a module that only includes custom annotations that exist in the manifest, along with enough information to support adding policy based annotations, is more likely.

In some embodiments, the schema for the manifest may include three basic parts:

A serialized representation of the annotations that are marked as "allows override".

A definition and any constraints, which may include but are not limited to, types, required/optional tag, range, membership of each annotation.

A definition of the values for each enumeration type that was an annotation member.

An exemplary partial schema for the manifest representing the annotation overrides is shown in FIG. 3.

In some embodiments, a custom module can be added to configure the application during deployment. That configuration module may build a cache of external configuration data and make that data available via application properties. Containers can then use a "finder" API to get the current set of overrides, which provides:

A mechanism for resolving the scope of a request.

A level of isolation between clients (e.g. the Control container) and the custom module.

In some embodiments, the custom module will use timestamps from the deployment plan to determine of any of the modules (for that application) had annotation changes during an update. For the modules that did have changes, the customized configuration module will:

Parse the updated annotation override document.

Merge the changes into an existing descriptor component (as a non-limiting example, a descriptor bean).

Change the last updated property on the descriptor bean. That will produce a module level change event for listeners (in cases where the descriptor bean framework does not support this directly).

In some embodiments, the control container may make use of a delegation model to resolve requests for property values at runtime. The data from external overrides is inserted into the chain behind calls to the control API, but in front of calls to the JSR175 API. For a non-limiting example, the control container holds a cache of override values that are used to support consistent results. When an external update occurs, a new version of the cache is built and new requests use the new cache.

In some embodiments, a mechanism can be utilized to support external override of annotations by taking an annotation instance (in a runtime context) and finding any relevant annotation override values. An important part of that mechanism is being able to define an annotation identity. Such an annotation can be uniquely identified by constructing a path that includes the type and location of the annotation. Since annotations can be nested, there is no "fixed" structure for the path. The path can be built via one or more of the following:

annotated-class-name, [field-name|method-name], annotation-class-name: [(0 . . . n) member-name]

wherein the path may begin with an annotated control type and the annotation can exist directly on the type, on a field of the type, on a method of type, or as a (nested) member of an annotation in any of the above mentioned locations. Since fields and methods do not share a namespace, the method or field name has to be included in order to have a valid path.

In some embodiments, a control implementation class that asks for annotation values should get the same result from subsequent requests within the same onAcquire( )/onRelease( ) invocation (i.e., repeatable-read semantics). If an implementation wants a stable value for annotations during the life of the instance, then they should only request annotation values during the onCreate( ) event.

In some embodiments, member values (properties) that contain security sensitive information should be encrypted instead of stored in clear text. An annotation may be provided to mark a property as needing encryption and two member values can be defined in a descriptor framework: one that was clear text and one that was encrypted. The annotation will only be valid on the member of an annotation that is marked as externally configurable. Then a "transient" property would be used by clients and implemented via a customization of the descriptor bean. The customizer would look at metadata about the member and determine which property to delegate the get/setOverrideValue( ) call to. The customizer is operable to conditionally encrypt/decrypt values based on metadata, and the benefit is a somewhat easier to understand schema. In both cases, there is a single get/setOverrideValue( ) API for clients (e.g. the console and the customer module) to use. The implementation choice is how many properties to store and where to put the encryption logic.

In some embodiments, the values of the annotations can be encrypted during the build process via the following options:

Writing the clear text values in the manifest, which is in the application. Reading the values out of the manifest will probably not be substantially harder than extracting string values out of the class file. In addition, the values associated with the "code" are unlikely to be useful in a production environment, whether in the class file or the annotation of the manifest. For a non-limiting example, the credentials may be missing entirely, or only be useful in a test environment.

Writing out a masked value to indicate that there was a value, but it cannot be displayed.

In either case, there is probably some level of user model work that needs to be done in the console or other user interface to indicate that the value can be changed, but the original value cannot be shown.

In some embodiments, the build of a module should fail if any annotations that are marked as externally configurable include member types, locations, or structures that are not supported. The control container should trap any type related runtime failures and raise them as a configuration error. This indicates that an incorrect value made its way into the deployment plan. An appropriate log message should also be generated to give the administrator sufficient information to locate the value in the deployment plan (e.g. the path to the element associated with the failed request, and the expected data type).

In some embodiments, the manifest may have a structural representation that follows the annotated code. The structure of the manifest expresses the structure of the annotated code (for a non-limiting example, annotated type->annotated field->annotation), as well as the structure of any annotations (e.g. annotation->nested annotation). This approach seems to make tooling more straightforward and may make it easier for users that use "schema aware" tools to directly edit the override document.

In some embodiments, the manifest may have a collapsed form that uses a key into to the code to collapse annotation overrides into simple (linear) list and bind a path expression to each annotation. The path would express the location of what the annotation annotates and would also express the structure of the annotation itself. There may be other in between approaches that further separate the notion of what is annotation from the annotation structure itself.

In some embodiments, additional type constraints can be used to define user customized types such as Date. For a non-limiting example, a member of type String can be annotated as a Date with optional min/max value(s). The external form of the annotations (manifest) needs to carry enough information to present validation "hints" to the user. Such basic type/membership constraints in the manifest allows the UI of the console to shape the user interaction.

In some embodiments, the set of constraint types can be aligned with XML Schema types for two reasons (1) they are common/familiar; (2) existing ways can be found to express the constraints via XML (e.g. xsi:type, or a variant of XForms), where the XForms specification can also be used to address the problem of how to have types in an instance documents constrained declaratively (e.g. via binding rules) rather than by explicit schema reference (although the model document can be associated with a schema).

In some embodiments, a configuration module deployed as part of the application can configure the application at deployment time via a descriptor associated with the application by applying annotation overrides from descriptor beans in the descriptor framework (note that in some embodiments, the descriptor can be part of a deployment plan). This module can be customized to provide services that include but are not limited to:

Access to the descriptors for external overrides;

Listen for plan updates and apply those changes to those descriptors.

If this customized module allows adding a deployment plan to an application/module that was originally deployed without a plan (as compared to just update), an empty descriptor is needed for each component module to target "add" change events. In environments that do not support custom modules, a more general lifecycle event listener may be an alternative approach.

In some embodiments, the descriptor bean framework may support non-dynamic properties via a mechanism to indicate whether a property changes requires restart of the application. If the property is not marked as requiring restart, then the change will take effect as soon as the target module processes the update. Since dynamic changes within a cluster are not atomic, old and new values may be in use at the same instant in time until all modules have processed the change.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more computing devices to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and applications.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Particularly, while the concept "component" is used in the embodiments of the systems and methods described above, it will be evident that such concept can be interchangeably used with equivalent concepts such as, module, resource, method, type, interface, class, object model, and other suitable concepts. While the concept "interface" is used in the embodiments of the systems and methods described above, it will be evident that such concept can be interchangeably used with equivalent concepts such as, bean, class, method, type, component, object model, and other suitable concepts. While the concept "instance" is used in the embodiments of the systems and methods described above, it will be evident that such concept can be interchangeably used with equivalent concepts such as, object, and other suitable concepts. While the concept "annotation" is used in the embodiments of the systems and methods described above, it will be evident that such concept can be interchangeably used with equivalent concepts such as, metadata, manifest, attribute, property, variable, member, field, element, and other suitable concepts. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A system to provide an external configuration framework, comprising:
   one or more computing devices;
   a manifest operable to define a plurality of annotations and their constraints;
   an application component configurable via the plurality of annotations at build time;
   a deployment configuration manager operable to configure values of the plurality of annotations under their constraints, and save the values as overrides of the plurality of annotations in an external descriptor at configure or deploy time;
   a deployment manager operable to distribute, start, stop, or update the application component at runtime;
   a descriptor framework operable to parse or validate the external descriptor at runtime, wherein a deployment plan is distributed to the descriptor framework in addition to the external descriptor; and
   a container operable to configure or update the application component externally at runtime with the overrides of the plurality of annotations upon receiving a notification of deployment or deployment change without restarting or redeploying the application component, wherein the container is operable to access the overrides of the plurality of annotations from the descriptor framework, and
   a custom module operable to: listen to deployment or update event at runtime; respond to the event by invoking the descriptor framework to parse or validate the external descriptor if it is changed; and generate the notification of deployment changes to be delivered to the container.

2. The system according to claim 1, further comprising:
   an administrative application operable to present or edit values of the plurality of annotations under their constraints, wherein the administrative application is a console, an IDE or a web-based administrative tooling environment such as Jython scripting.

3. The system according to claim 1 wherein:
   the external configuration framework is implemented in one of a Java®, programming language, a C++ programming language, and a C# programming language via one of a bean object, an enterprise bean object, and a class.

4. The system according to claim 1, wherein:
   the application component is deployed under a Java® platform environment.

5. The system according to claim 1, wherein:
   each constraint on the plurality of the annotations is one of: a data type, a range, an optional or required tag, and a membership rule.

6. The system according to claim 1, wherein:
   the plurality of annotations have a structural or a collapsed form of representation.

7. The system according to claim 1, wherein:
   values of the plurality of annotations are in clear text or encrypted.

8. The system according to claim 1, wherein:
   the deployment configuration manager is further operable to perform at least one of the following operations:
   identifying a subset of the plurality of annotations to be externally configurable;
   setting values of the subset of the plurality of annotations identified as externally configurable;
   replacing or removing the existing values of the subset of the plurality of annotations identified as externally configurable;
   supporting dynamic setting of the subset of the plurality of annotations; and
   creating an external representation of overrides of the subset of the plurality of annotations by serializing them to an XML file.

9. The system according to claim 1, wherein:
the deployment manager or the deployment configuration manager is integrated with a Java® application programming interface configuration process.

10. The system according to claim 1, wherein:
the external descriptor is in XML format.

11. The system according to claim 1, wherein:
the type of the container is a control or an enterprise bean object.

12. A method to provide an external configuration framework, comprising:
defining and populating, at a computing device, a plurality of annotations and their constraints specified at build time to an application component;
configuring the application component via the plurality of annotations of under their constraints;
saving values of the plurality of annotations as overrides into an external descriptor at configure or deploy time;
distributing, starting, stopping, or updating the application component at runtime;
distributing, parsing or validating the external descriptor at runtime;
distributing a deployment plan at runtime in addition to the external descriptor;
configuring or updating the application component with the overrides of the plurality of annotations externally at runtime upon receiving a notification of deployment or deployment change without restarting or redeploying the application component; and
accessing the overrides of the plurality of annotations, listening to deployment or update event at runtime; responding to the event by invoking the descriptor framework to parse or validate the external descriptor if it is changed; and generating the notification of deployment changes to be delivered to the container.

13. The method according to claim 12, further comprising:
presenting or editing the plurality of annotations under their constraints via an administrative application, which is one of a console, an IDE or an administrative tooling environment such as Jython scripting.

14. The method according to claim 12, further comprising at least one of:
identifying a subset of the plurality of annotations to be externally configurable;
setting values of the subset of the plurality of annotations identified as externally configurable;
replacing or removing the existing values of the subset of the plurality of annotations identified as externally configurable;
supporting dynamic setting of the subset of the plurality of annotations; and
creating an external representation of overrides of the subset of the plurality of annotations by serializing them to an XML file.

15. A tangible machine readable medium having instructions stored thereon that when executed cause a system to:
define and populate a plurality of annotations and their constraints specified at build time to an application component;
configure the application component via the plurality of annotations of under their constraints;
save values of the plurality of annotations as overrides into an external descriptor at configure or deploy time;
distribute, start, stop, or update the application component at runtime;
distribute, parse and/or validate the external descriptor at runtime;
distribute a deployment plan at runtime in addition to the external descriptor;
configure or update the application component with the overrides of the plurality of annotations externally at runtime upon receiving a notification of deployment or deployment change without restarting or redeploying the application component; and
access the overrides of the plurality of annotations, listening to deployment or update event at runtime; responding to the event by invoking the descriptor framework to parse or validate the external descriptor if it is changed; and generating the notification of deployment changes to be delivered to the container.

16. A system to provide an architecture for external control configuration, comprising:
one or more computing devices;
means for defining and populating a plurality of annotations and their constraints specified at build time to an application component;
means for configuring the application component via the plurality of annotations of under their constraints;
means for saving values of the plurality of annotations as overrides into an external descriptor at configure or deploy time;
means for distributing, starting, stopping, or updating the application component at runtime;
means for distributing, parsing or validating the external descriptor at runtime;
means for distributing a deployment plan at runtime in addition to the external descriptor;
means for configuring or updating the application component with the overrides of the plurality of annotations externally at runtime upon receiving a notification of deployment and/or deployment change without restarting or redeploying the application component; and
means for accessing the overrides of the plurality of annotations, means for listening to deployment or update event at runtime; means for responding to the event by invoking the descriptor framework to parse or validate the external descriptor if it is changed; and means for generating the notification of deployment changes to be delivered to the container.

* * * * *

UNITED STATES PATENT AND TRADEMARK OFFICE
CERTIFICATE OF CORRECTION

PATENT NO. : 7,607,126 B2  Page 1 of 1
APPLICATION NO. : 11/134714
DATED : October 20, 2009
INVENTOR(S) : David Read It is certified that error appears in the above-identified patent and that said Letters Patent is hereby corrected as shown below:

Title Page, Item (56) on page 2, in column 2, under "Other Publications", line 8, delete "Serives" and insert -- Services --, therefor.

Title Page, Item (56) on page 2, in column 2, under "Other Publications", line 10, delete "enhace" and insert -- enhance --, therefor.

In column 1, line 24, delete "Erick" and insert -- Eric --, therefor.

In column 6, line 2, delete "externaConfig" and insert -- externalConfig --, therefor.

In column 10, line 20-21, in claim 1, after "framework," delete "and a custom module operable to:".

In column 10, line 35, in claim 3, delete "Java®," and insert -- Java® --, therefor.

In column 12, line 12, in claim 3, delete "and/or" and insert -- or --, therefor.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO.        : 7,607,126 B2
APPLICATION NO.   : 11/134714
DATED             : October 20, 2009
INVENTOR(S)       : David Read It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this

Twelfth Day of October, 2010

David J. Kappos
*Director of the United States Patent and Trademark Office*